US009774792B2

(12) United States Patent
Hinkel

(10) Patent No.: US 9,774,792 B2
(45) Date of Patent: Sep. 26, 2017

(54) DYNAMIC CONFIGURED VIDEO CAMERA

(71) Applicant: MOBOTIX AG, Winnweiler (DE)

(72) Inventor: Ralf Hinkel, Hoeringen (DE)

(73) Assignee: MOBOTIX AG, Winnweiler (DE)

(*) Notice: Subject to any disclaimer, the term of this patent is extended or adjusted under 35 U.S.C. 154(b) by 0 days.

(21) Appl. No.: 14/708,088

(22) Filed: May 8, 2015

(65) Prior Publication Data
US 2015/0334295 A1 Nov. 19, 2015

(30) Foreign Application Priority Data

May 9, 2014 (DE) .................. 10 2014 208 771

(51) Int. Cl.
H04N 5/262 (2006.01)
H04N 5/232 (2006.01)
H04N 5/06 (2006.01)

(52) U.S. Cl.
CPC ....... *H04N 5/2628* (2013.01); *H04N 5/23209* (2013.01); *H04N 5/23225* (2013.01); *H04N 5/23238* (2013.01); *H04N 5/23296* (2013.01); *H04N 5/06* (2013.01); *H04N 5/23216* (2013.01)

(58) Field of Classification Search
CPC ........... H04N 5/23225; H04N 5/23209; H04N 5/23296; H04N 5/23238; H04N 5/23216; H04N 5/2628; H04N 5/06; H04N 5/3765
See application file for complete search history.

(56) References Cited

U.S. PATENT DOCUMENTS

| | | | | |
|---|---|---|---|---|
| 7,403,232 B1* | 7/2008 | Orlicki | .................. | G06F 1/1626 348/372 |
| 7,418,579 B2* | 8/2008 | Guibert | ............... | G06F 15/7867 326/38 |
| 9,077,887 B2* | 7/2015 | Kim | .................... | H04N 5/23203 |
| 2004/0169738 A1* | 9/2004 | Fujimoto | ........... | H04N 5/23241 348/222.1 |
| 2008/0098211 A1 | 4/2008 | Maeda | | |
| 2011/0091216 A1* | 4/2011 | Addy | .................... | G06K 7/0004 398/115 |
| 2014/0098220 A1* | 4/2014 | Nunnink | ................ | H04N 5/232 348/135 |

OTHER PUBLICATIONS

Herkersdorf, A., et al., "AutoVision—Reconfigurable Hardware for video-based Driver Assistance Systems," Technische Universität München, Sep. 24, 2009, pp. 1-24. https://www12.informatik.uni-erlangen.de/spprr/colloquium09/autovision.pdf.

Zheng, H., et al., "Real-time correction of distortion image based on FPGA," 2010 International Conference on Intelligent Computing and Integrated Systems (ICISS), Oct. 22-24, 2010, pp. 167-170, IEEE.

* cited by examiner

Primary Examiner — Luong T Nguyen
(74) Attorney, Agent, or Firm — Slater Matsil, LLP

(57) ABSTRACT

A method for providing video data streams is disclosed. In an embodiment the method includes generating video image data by a digitally adjustable video camera arrangement and preparing the video image data by a reconfigurable logic cell arrangement, wherein during camera operation, settings of the video camera arrangement are changed, adapted reconfiguration data for the reconfigurable logic cell arrangement are calculated in view of the amended settings and provided to the logic cell arrangement, and wherein the logic cell arrangement is configured with the reconfiguration data at runtime.

21 Claims, 5 Drawing Sheets

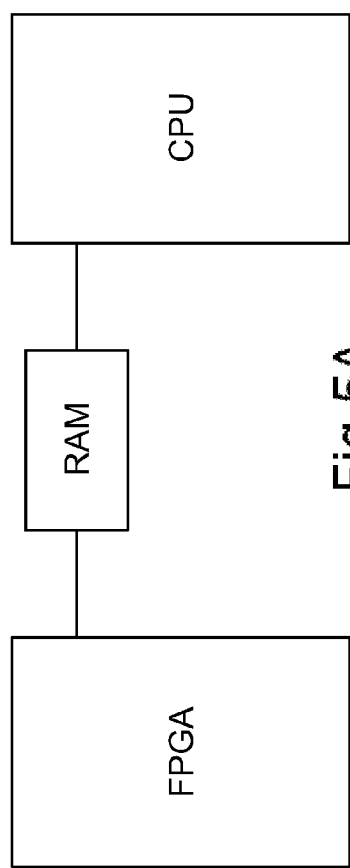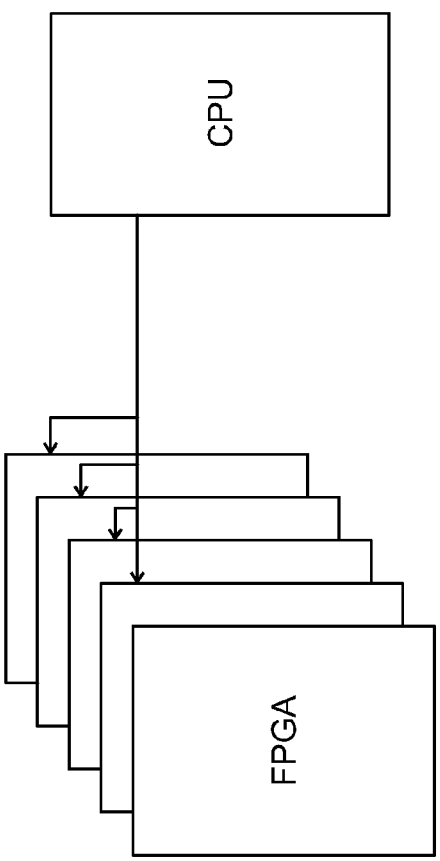

DYNAMIC CONFIGURED VIDEO CAMERA

This patent application claims the priority of German patent application 10 2014 208 771.6, filed May 9, 2014, and is incorporated herein by reference in its entirety.

TECHNICAL FIELD

The present application relates to cameras and in particular to video cameras.

BACKGROUND

Video cameras, in particular video cameras which are used for monitoring purposes, should provide a large volume of image data with the power consumption being as low as possible. However, the data processing tasks are significant. They include, i.e., the preparation of the raw data from an image sensor, for example, the generation of a color image on the basis of the color image recorded by using a Bayer filter, denoising, the performance of gamma corrections, the compression of individual images, e.g., by means of JPEG algorithms, the M×PEG method and the like, the compression of image data video streams in view of image parts that are not of interest, image parts with at the most marginal changes in the long run and so on, the perspective rectification, the rectification of fish eye lens images in connection with the use of wide-angle lenses for monitoring purposes, the selection of image details and so on.

In particular in connection with high-resolution sensors, the data volumes to be processed are often quite significant. At the same time, however, the same image processing steps have to be performed again and again as long as there are no severe changes. For example, the calculations for perspective distortions remain unchanged as long as the viewing direction and the selected image detail do not change. Furthermore, denoising algorithms, gamma corrections and so on are almost the same for a plurality of images as long as the light situation does not change or changes at the most little. Thus, it makes sense per se to adapt the data processing in an optimum manner in accordance with the recurring processing steps that are the same during a relatively long time period.

For carrying out always the same processing steps with data of a data stream, FPGAs are particularly suitable. In modern FPGAs, a plurality of coarse-granular arithmetic and logic units (ALUs) are present, by means of which a plurality of processing steps can be carried out in parallel and subsequently. For this purpose, the function of each ALU is determined once, i.e., "configured", and the intermediate results obtained in a step-wise manner are passed on from ALU cell to ALU cell in the FPGA.

It is pointed out that local feedback loops, for example, for realizing MAC functionalities etc., can be present and that local registers or memory spaces can be used. As an example only, reference is made to modern FPGA architectures such as the Virtex series of the company Xilinx which have been available at the filing date. The use of FPGAs for the use of data streams is advantageous in particular because it is not necessary to load and decode a new command for each processing step as is the case in sequential processors.

However, it should be taken into consideration that when the desired data processing of the data stream changes, a new configuration of the FPGA must be provided. This is called reconfiguration and there are techniques for reconfiguring the FPGA such that the reconfiguration needs only little time and can possibly and preferably take place partially, i.e., by maintaining the configuration on the other FPGA parts which should presently maintain their functionality, i.e., should not be reconfigured.

From the essay "Internal dynamic partial reconfiguration for real time signal processing on FPGA" by S. U. Bhandair, Indian Journal of Science and Technology, vol. 3, no. 4, April 2010, ISSN 0974-6846 it is known to process audio-video data by means of an FPGA that can be reconfigured at runtime. It is stated that a present sequential processor can configure the audio and video filters in accordance with the selection of a user by loading respective partial configuration bit streams through a specific port into the FPGA. Achievable configuration times are determined. It is pointed out that irrespective of the audio and video filters used for description purposes, also other applications should at the same time profit from the described kind of reconfiguration via the specific port. According to other research, see B. Draper, R. Beveridge, W. Böhm, C. Ross and M. Chawathe in "Accelerated Image Processing on FPGA's", IEEE Transactions on Image Processing, 12(12):1543-1551, 2003, a considerable acceleration as compared to sequential processors can be achieved by using FPGAs. Programming difficulties are said to be reduced by a programming language in which i.e. pointers and recursions are forbidden and variables are assigned only once. It is discussed that stand-alone-applications on FPGAs are desirable, e.g., in a camera for security applications, for monitoring images in view of irregularities and for informing users via the Internet. Movement detection and face recognition are mentioned.

From the document A. Herkersdorf and W. Stechele: "AutoVision—Reconfigurable Hardware for video-based Driver Assistance Systems"—TU München, September 2009, available under URL: https//www.12.informatik.uni-erlangen.de/spprr/colloquium09/autovision.pdf, it is known to prepare video data for driver assistance systems by means of FPGAs, wherein for the FPGAs a dynamic parallel reconfiguration is discussed as inter or intra video frame reconfiguration. It is mentioned that specific conditions such as daytime and nighttime require different evaluations and the influence of the reconfiguration time is discussed.

US 2008/0098211 A1 discloses the dynamic reconfiguration of data-processing circuits, wherein for achieving a partial reconfiguration, a memory is provided which comprises information for an alternative configuration which should be linked with original configuration information.

From the essay "Real-time correction of distortion image based on FPGA" by H. Zheng and J. Lee in International Conference on Intelligent Computing and Integrated System (ICISS); IEEE Conference Publication, 2010, pages 167-170, it is known to prepare video image data in a block-wise manner by means of an FPGA for achieving a distortion of an infrared camera image. The information required for the rectification is said to be stored in a lookup table in a ROM.

The essay "3-D Perspective Video Scaling Effects on FPGA" by Eivind Karlsen, Norwegian University of Science and Technology, 2013, discloses the use of a module for converting video signals between two different resolutions (video scaler) for carrying out a perspective transformation of a video stream. It is discussed that depending on the implementation of the algorithms, different image qualities can be achieved. Moreover, two different calculation methods are mentioned, namely "forward mapping", wherein the position of each input pixel is calculated in the output image and a frame buffer is necessary for the output for storing the output image during its generation and, on the other hand, the "reverse mapping", wherein each output pixel is calculated sequentially.

From the essay by Pierre Greisen et al. "An FPGA based processing pipeline for high-definition Video", Eurasip Journal on Image and Video Processing 2011, 2011:18, the video-image processing for endoscopic video recordings is known. FPGAs are said to be used for carrying out, i.e., image rectification and an estimation of inequalities in real-time and with full HD-resolution. These inequalities are said to be based directly on differences in the camera views resulting from the actual geometry of a scene. It is mentioned that specific corrections such as color corrections and rectification corrections are particularly important in stereo recordings for achieving an improved image reproduction. The over-linear increase in the processing complexity with increasing video resolution is mentioned. The FPGA is said to be integrated in a heterogeneous PC platform which also comprises a CPU and a GPU. It is suggested that the CPU and the GPU resources are used for operations such as control algorithms for the system settings or for storage-intensive algorithms such as segmenting, which are ill-suited for FPGA processing. An architecture is suggested in which first sensor noise (pattern noise) is corrected and different pixel sensitivities are compensated for. Then the Bayer demosaicing is said to take place, a linear color correction is carried out in accordance with a selected color space. It is stated that these processing steps can be carried out in a pipelined manner on small data windows. It is stated that the video streams coming in from two cameras for 3D purposes can be temporarily stored in small FIFOs for the purpose of synchronization, which is said to be advantageous in case of small deviations of the camera clocks. It is also mentioned that it can be advantageous to temporarily store data in a sufficiently large cache.

From the essay "Low-Cost real-time depth perception with FPGAs" by B. Borosky, Microtechnology Europe, April 2008, pages 28 et seqq., it is known to correct fish eye images by means of FPGAs by linking the image pixels by using a lookup table (LUT).

SUMMARY OF THE INVENTION

According to a first aspect of the present invention, a method is suggested for providing video data streams, wherein video image data are generated by means of a digitally adjustable video camera and prepared by means of a logic cell arrangement that can be reconfigured at runtime, wherein during the camera operation settings of the digital video camera arrangement are changed, during the camera operation values for reconfiguration data for the logic cell arrangement that can be reconfigured at runtime are calculated, said values being adapted in view of the changed settings, and the logic cell arrangement is dynamically reconfigured at runtime with the provided reconfiguration data.

Hence, it has been found that the reconfiguration of a logic cell arrangement which is used for the camera data preparation does not impair the preparation and/or reproduction of video (raw) data if the configuration data are first prepared and then the reconfiguration of the logic cell arrangement takes place dynamically, i.e., at least quasi without interruptions during ongoing operation, wherein this also allows monitoring of the video data streams for security purposes without causing considerable adverse effects.

In the following it will become evident that the calculation of the reconfiguration data comprises a determination of coefficients for linear links of image pixel data, i.e., in this regard extends beyond a determination, which is in the present case not considered to be a "calculation", of address data of a storage area in which specific configuration data have been stored in advance. In particular, a calculation in the meaning of the invention is concerned if coefficients of linear operations are determined, which are necessary for converting a raw data image or an early intermediary data image to an output image or a later intermediary data image. The coefficient determination will typically comprise linear operations such as multiplication by other coefficients, and the evaluation of trigonometric functions for rectification, de-tilting, etc. The coefficients that can be calculated in accordance with the invention are preferably coefficients of correction matrices used during image data preparation. As will be evident from the following, the pixels in an output image are influenced by comparatively close pixels in an input or raw data image. These comparatively close pixels of the raw data image can be directly neighboring raw data pixels or raw data pixels which are at some distance but, because of strong image distortions, achromatic aberrations, etc., nevertheless have an influence on the output image pixel. It is obvious that pixels very far away have no influence, i.e., will correspond to zero coefficients in a correction matrix. The matrix necessary for determining an output pixel value will thus be relatively small and will have to take into consideration only few pixels to the left of, to the right of, above and below an output pixel. The correction matrix for a given output pixel therefore can be small and it can be, e.g., a 2×2, 4×4, 8×8 or 16×16 matrix, even if high-resolution input image data are present and/or correspondingly high-resolution output images are desired, which have a VGA resolution or a clearly higher resolution. Matrices having different sizes can offer different advantages. It is obvious that very small correction matrices require very little computing. The smaller a correction matrix, the fewer energy is thus as a rule required by the camera for image processing. If only a 2×2 matrix is used for the correction, only four parameters per output pixel must be determined for calculating the configuration data, but the image processing possibilities are typically restricted. A 2×2 matrix can be used, e.g., for a black-white image which is recorded by a sensor without Bayer filter which does not have to be denoised, wherein there are also only little requirements as to an interpolation, e.g., for compensating for pixel defects. Therefore, it is typically preferred if at least a 4×4 parameter matrix is determined for each output pixel, which leads to improved possibilities of debayering, improves denoising, allows the compensation for slight distortions, etc. However, it is particularly preferable to use 8×8 matrices, because also in this case relatively strong distortions can be taken into consideration and, moreover, in the image processing often 8×8 blocks are used for the treatment of 8×8 pixel blocks, e.g., for JPEG compression. Because of the frequent use of 8×8 blocks, an efficient processing in typical FPGA components is probable by using the FPGA elements or using them as completely as possible. Even larger matrices such as 16×16 matrices allow a more extensive refining, the correction even of very extreme distortions where at the same time considerable aberrations are present, etc.

It is pointed out that the operations necessary for calculating an (overall) correction matrix can be processed quickly and in this regard the calculation of the correction matrix coefficients does not cause any problems in view of the determination of a configuration at runtime so that changed configurations can be determined, e.g., during the runtime of the camera simultaneously with changes of, e.g., PTZ parameters. In this connection it is explicitly pointed out that after the determination of the correction matrix and/or the non-disappearing parts thereof, it is easily possible to determine corresponding configuration data or, more precisely, the data for a partial reconfiguration which is only carried out for considering coefficient changes and only changes the operands, constants, etc. stored in view of these coefficients on the reconfigurable array.

The processing of intermediary images has been mentioned above. It is pointed out that prior to the camera data processing according to the invention, raw image data can, if necessary, be subjected to a first treatment by means of which non-uniform pixel sensitivities, varying thicknesses of the sensor filter cover layers, defect pixels and so on can be compensated for. If necessary, specific ones of these processes even run on the sensor's own ASIC circuits, independent of the later image data processing. In this regard it is pointed out that also a "raw data treatment" does not exclude in the following that a first data treatment of digitized sensor values has already taken place.

In a particularly preferred embodiment, the video camera is a PTZ-capable video camera in which, during its operation, the PTZ parameters can be changed and then (after their calculation and thus almost in real time, i.e., during the camera operation and thereby completely without interruption of the camera operation or at least without interruption of the camera operation for longer than, e.g., one frame or a few frames) the configuration data are changed in order to allow a changed image rectification. This is particularly advantageous if the camera is a wide-angle camera, for example, a fish eye camera and/or a camera having more than one lens, wherein at least one of the lenses is a wide-angle lens, in particular a fish eye lens. In such cameras, the PTZ (pan, tilt, zoom) parameters can be selected electronically without a real mechanical movement of components being necessary. The speed at which other image details, etc. can be selected digitally is, in particular in modern high-resolution sensors, comparatively fast, in particular as compared to mechanical changes. Here, too, a particularly simple adaptation of the image data processing is possible because, on the one hand, only reconfiguration data must be changed and, on the other hand, often an almost real-time preparation is desired. Because of the simple reconfiguration, it is possible to react quickly to such fast changes.

It is pointed out that in addition to the geometric correction that is known per se for the use of fish eye lenses for wide-angle cameras or other wide-angle lenses for cameras (so that it is not necessary to discuss the respective rectification algorithms here), other changes of the video camera can be determined by means of the logic cell arrangement as well. These changes include the color temperature adaptation, e.g., to a medium color temperature of either the overall image or a respective selected image detail and/or a detail of an image or partial image that can be selected automatically or by user default. It is further referred to algorithms for denoising image details causing strong noise, such as those recorded with bad lighting conditions. Moreover, where drop-outs or digital drop-outs occur, it is also possible to make a configuration adapted thereto, e.g., for interpolation.

It is pointed out that it is possible to determine some of the reconfiguration data by image analysis. They include, e.g., the current color temperature and/or the configuration data as far as they are necessary for an improved white balance. In such a case in which an image analysis is carried out, the latter can be carried out either on the reconfigurable logic cell field itself or in the more or less completely prepared image, in the latter case in particular also by a further computing unit such as a sequential CPU, which can be separate from the reconfigurable logic cell field. The reconfigurable logic cell field can of course be an FPGA, but this is by no means compulsory.

If the video camera arrangement is a sufficiently high-resolution, wide-angle video camera arrangement, it is possible to define a plurality of image areas as sections in a relatively large image and to respectively rectify and/or prepare them in accordance with the current parameters. In such a case, an overall processing of a raw image can be made completely; in the accordingly processed raw image, one or more details can then be selected, geometrically rectified, if necessary, and then be compiled, combined to an overall video data stream.

This leads to a merely electronic panning, tilting and zooming by selecting and determining suitable PTZ parameters in the digital range.

If a central processing unit (CPU) is used for determining PTZ parameters, it can also be used, if necessary, for determining which values the respective reconfiguration data should have and/or for determining the reconfiguration data. Depending on the speed at which a CPU calculates new reconfiguration parameters, if necessary, the previously used configuration data can still be used for rectification until the calculations are finished.

Assuming a sufficiently fast calculation wherein at the most the duration of few frames—such as one or two frames, with usually 24 frames per second—is necessary for the calculation, the user notices this at the most as a slight delay in the monitored image in case of panning and/or as a short deformation running through the image.

However, since such disturbances often occur in conventional, analogously panning cameras, the user will not be bothered much by such a delay but consider it to be comparatively natural, all the more since it can be appreciated that in case of a typical computing performance of sequential CPUs as used in addition to reconfigurable logic cell arrangements, at the most short (transient) disturbances are to be expected.

If the changed configuration data are calculated comparatively slowly, it is possible and preferred to provide a memory in which the gradually calculated new reconfiguration data are stored and to use the new reconfiguration data stored in the memory only after the calculation of the configuration data for a new parameter set, e.g., a changed PTZ parameter set, has been completed, while the previous reconfiguration data are being used until this point in time.

Moreover, where a to and fro movement of a camera should be realized by physical movement or, in case of a camera which records wide-angle images, should be simulated digitally, it is possible and preferred to store reconfiguration data sets which occur along a panning trajectory and which first have been calculated in accordance with the invention in a relatively large memory and then position a pointer to respective configuration data sets and thus select corrections in accordance with a real or simulated trajectory.

In case of a panning movement which takes a relatively long time, it is—depending on the speed of the panning movement—not necessary to determine by calculation own configuration data for each resolvable position of the trajectory. Rather, reconfiguration data can be determined in coarser steps, and these data can then be used. If the steps are not too far apart, at most a slight disturbance can be monitored. The latter can in particular be reduced if a panning trajectory is in advance known completely or approximately because it can be anticipated, e.g., on the basis of steadiness considerations in view of a trajectory passed so far. This is disclosed as being preferred.

In a typical application, the video camera will generate frames in a clocked manner and the logic cell clocking of the camera arrangement will also operate in a clocked manner. Here, it is possible to cause a synchronization of video camera clocking and logic cell clocking, in particular to the extent that reconfiguration data are configured out of the memory into the logic cell arrangement in a synchronized manner.

The configuration of reconfiguration data into the logic cell arrangement can be performed upon request of the logic cell arrangement, for example, if the logic cell arrangement generates a signal by means of which it signals that a specific processing state has been reached; it is also possible that the reconfiguration is enforced from outside, so that the logic cell is synchronized to an external clock, e.g., in accordance with the video sync data such as in line-related and/or frame-related signals.

It is not mandatory that the logic cell or logic cell arrangement is so large that a complete image can be processed without reconfiguration. Rather, it will be appreciated that this leads to cost advantages, in particular in case of very large, i.e., high-resolution images, if a block-wise data processing, e.g., of multiple subsequent lines of an image takes place. In such a case it is obvious that the prepared video image data generated by the logic cell arrangement can be stored until a frame has been completed.

In a particularly preferred case, the video image data are prepared by linking image pixels, in particular image pixels of the raw image, in such a manner that multiple pixels of an image obtained by the sensor of the video camera after suitable conditioning, if applicable, are prepared by using coefficients for generating the output image. This can be done, e.g., by matrix multiplication. In such a case it is possible and preferred to change only the (matrix) coefficient for the reconfiguration of the logic cell arrangement. This has the enormous advantage that the runtimes of the data via different paths in the logic cell arrangement will not change significantly so that no adaptations of the so-called path balancing are necessary. This in turn allows a partial reconfiguration with the lowest possible efforts. This has further advantages, also because the new configuration data which are necessary for a reconfiguration and must be configured into a logic cell field are minimized. Hence, a (partial) reconfiguration can be implemented faster. Moreover, it is possible to calculate the image in a block-wise manner in that only the parameters, i.e., matrix coefficients which are required for respective lines are newly provided. This allows a transition to new rectification data giving a particularly organic transition. The block-wise calculation of the image can—as already discussed above—be carried out by using correction matrices having a suitable size such as 8×8 matrices. Moreover, the following is pointed out: Image data of an input image or of an intermediate image intermediarily obtained during the calculation of the output image are processed in that a "sliding" image block is changed so that, e.g., in a step n the pixel rows (m . . . m+8) of an original image and in a next step n+1 the pixel rows (m+1 . . . m+9) are treated. In such a case, many exactly equal operations with exactly the same pixels are carried out again and again. Hence, it can make sense in such a case to store the thus exactly equal intermediate results in order to reduce the overall calculation work. It is disclosed that also in such a case a simple reconfiguration is possible and that it is in particular possible to carry out reconfigurations with new configuration data calculated at runtime without changing the path balancing.

In principle it would be possible to determine the configuration on and with the logic cell arrangement itself. This could be done in two different ways, namely either by having reserved a specific area of the logic cell arrangement permanently for the calculation of reconfiguration data and/or other tasks while other areas of the logic cell arrangement are used for image data preparation. Alternatively, it would be possible to load a particular configuration for calculating new configuration data, which then uses large parts of the logic cell arrangement, i.e., for example, of the FPGA. In such a case the determination of the coefficients would be clearly accelerated, but the efforts are higher due to the reconfiguration and, if applicable, an interruption of the image preparation must be accepted if no sufficiently large logic cell field is used, which will be undesirable in particular for monitoring purposes in safety engineering, all the more since changes of the PTZ parameters must be expected in particular if actually or possibly safety-relevant events are monitored.

Therefore, it is particularly preferred if the configuration data are calculated by a separate unit, in particular a sequential CPU. In such a case the CPU can trigger or cause a reconfiguration, i.e., that after determination of the changed reconfiguration data set has been completed, the reconfigurable logic cell field accesses other storage areas, namely where the changed reconfiguration data set was stored.

BRIEF DESCRIPTION OF THE DRAWINGS

In the following, the invention will be described only by way of example with reference to the drawings in which FIG. 5*a* shows a detail of the preceding embodiments, and FIG. 5*b* shows an alternative of the detail of FIG. 5*a*.

DETAILED DESCRIPTION OF ILLUSTRATIVE EMBODIMENTS

Figure 1:
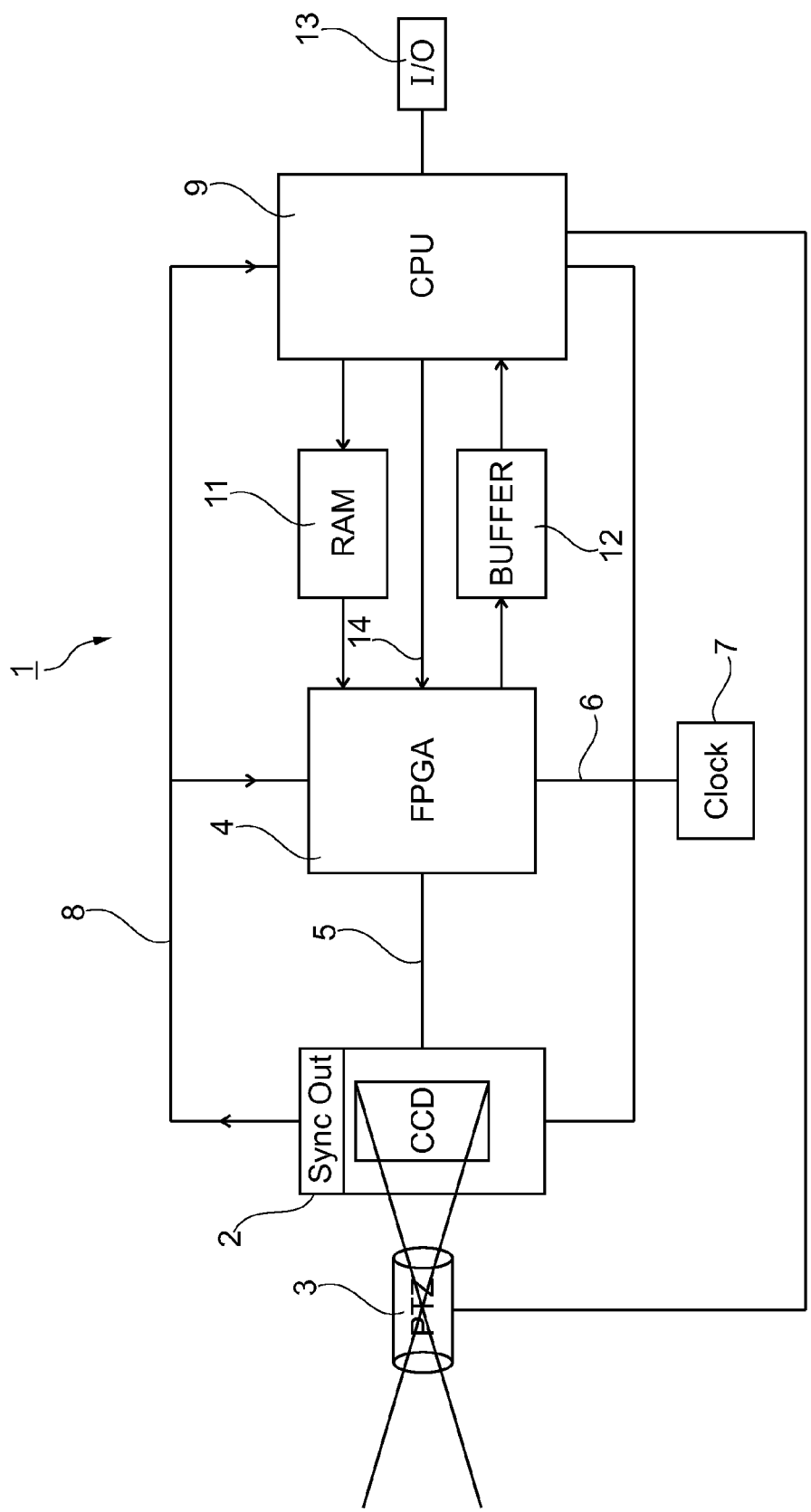
FIG. 1 shows a video camera arrangement according to the present invention.

According to FIG. 1, a video camera arrangement, which is generally referred to as 1, comprises an image sensor 2 which detects environmental images by means of a zoom-capable lens 3 and can be panned and tilted therewith so that a PTZ-capable image recording is guaranteed. The video camera arrangement 1 further comprises an FPGA 4 as reconfigurable logic cell arrangement, wherein, if applicable, the FPGA 4 receives from the image sensor 2 conditioned video raw data via a line 5, receives clock signals from a clock source 7 via a clock line 6, receives video sync signals, namely in the embodiment—here line synchronization signals—and full image synchronization signals via a line 8 from the image sensor 2 which, in the embodiment of FIG. 1, also sends synchronization signals to a CPU 9 which in turn receives signals from the clock generator 7 via the line 6, stores configuration data for the FPGA 4, as will be described below, in a random access memory (RAM) 11 and receives processed video image data from the FPGA 4 via a buffer (memory) 12. The FPGA 4 is further connected via a control line 14 to the CPU 9 through which it receives reconfiguration commands, in particular an address at which reconfiguration data for a partial reconfiguration are stored. It is pointed out that, if applicable, also busses or the like can be used although one or more dedicated lines are described for the sake of clarity.

The CPU 9 is connected to an input/output unit, for example, a TCP/IP-capable network connection via suitable busses for outputting prepared video data streams from the camera arrangement 1, see reference number 13. Via the interface 13, also a PTZ default can be received, i.e., it is indicated in which direction the video camera arrangement should pan, tilt and zoom. It is pointed out that the PTZ control signals can be predetermined outside the camera, e.g., via a PTZ control device such as a keyboard of a computer.

Moreover, for the sake of a clear explanation, it is assumed in the present case that the camera in fact really pans, tilts and zooms. However, this is not urgently necessary and it will be evident from the following that it is easily possible to use a sufficiently high-resolution, digital image sensor with a wide-angle lens and then simulate a PTZ change of the high-resolution image by selecting an image detail. It will be evident from the following that the invention can be realized in both cases—i.e., both with real and with virtual movement.

The image sensor 2 provides for a conditioned raw image data stream, i.e., digital data which are output, e.g., serially at a specific frequency pixel by pixel in a line-wise and frame-wise manner. In the present embodiment, the image sensor is a conventional CCD sensor which is provided with a Bayer filter and has a number of pixels that is sufficient for the desired resolution, and which has red-sensitive, green-sensitive and blue-sensitive pixels due to the Bayer filter provided in front of the sensor pixels. For generating an image with natural color effect from these raw image data, first a preparation has to be carried out, the so-called debayering or demosaicing.

Moreover, as is known per se, it might be the case that the prepared image has a color fault caused by deviations between an expected so-called "color temperature" and the "color temperature" observed. For correcting this, a white balance is necessary. Otherwise, e.g., images which are recorded with green lamp light but for which a color balance for daylight is made seem to have a yellow tint. For carrying out a white balance, the raw image data recorded with the red-sensitive, green-sensitive and blue-sensitive sensor pixels are weighted differently. Another white balance thus requires changed weighting factors. The white balance per se is a linear operation by means of which raw image pixels are linked to output image pixels.

The use of very wide-angle lenses or very wide-angle settings of a zoom lens can lead to distortions in the image, in particular if low-priced optics are used. Known extreme examples for this are fish eye images, but also in less extreme cases it can be hard to see details in the image. For this purpose, a geometric rectification makes sense so that the user is presented non-distorted or at the most slightly distorted images. In an output image generated by geometrical rectification, image details can be found in places different from that of the distorted image. Hence, for determining the rectified image it is apparently necessary to determine which pixels of an input image make a contribution to specific pixels of an output image. For example, multiple pixels of the input image (input image pixels) can commonly contribute to an output image pixel; these combinations are in turn linear so that it is possible to describe the rectification by linear matrices and to calculate the rectification as matrix operation. The corresponding matrices vary as the distortion varies, but the algorithms for determining the rectification matrices are per se well known. A geometrically rectified output image can per se be provided, e.g., in that either an intermediate image having the correct colors but being geometrically distorted is first calculated on the basis of the raw image, or, e.g., RGB converting, white balance and rectification are calculated simultaneously with a common matrix. It is pointed out that specific corrections of the image are often made independent of the position in the image, wherein here effects at the edge are not taken into consideration. If applicable, zero values, values lying inside close to the edge and being mirrored outwardly or the like can be used here, as is known per se, or only an area lying sufficiently inwardly is evaluated, so that edge effects can be disregarded. For example, in the entire image area debayering always takes place in the same manner and, if applicable and equal color temperatures across the entire image being implied, also a white balance is carried out in the same manner. Moreover, also the pixels can always be combined in the same manner across the entire image for the purpose of denoising, if desired. These—and, if applicable, further—operations are all linear and it is possible to determine a matrix by means of which all these operations which are equal for the entire image are carried out by one single matrix multiplication per pixel. It is pointed out that several, but few matrices are necessary for this purpose because during debayering a blue pixel must be treated in a different manner than a red or green one. However, this does not change the fact that for all green pixels of an image the same corrections are then necessary, also for all red ones, etc.

Against this background there are two options for handling the image data correction of a video camera whose images have to be rectified geometrically, i.e., independently of PTZ parameters, a tilting of horizontal structures noticed in the image, etc. On the one hand, first the entire image can be subjected to those corrections which are equal across the entire image area and then the specific rectification from pixel to pixel can be carried out, which is specific for a respective image detail because of the geometric distortion which is, e.g., in a fish eye image at the left other than at the right. Carrying out the corrections which are similar across the entire image area separately is advantageous in that the entire image can be corrected completely without any changes from line to line or pixel to pixel being required. The thus partially corrected intermediate image, which has, e.g., been slightly white-balanced, denoised and debayered, can then be stored and then the rectification that is specific for the image position can be carried out. This is disadvantageous because an intermediate storage is necessary and the FPGA must be passed through twice, which requires a higher clock rate. It would also be possible to carry out the fixed correction, which is equal throughout the entire image, in an area of the FPGA and then allow the data to stream into other areas of the FPGA in a data flow like manner where a specific rectification, etc. for the respective position of a pixel in the image is carried out. Then only a partial reconfiguration of these areas must be carried out. This solution is disadvantageous because then apparently a larger FPGA is necessary.

An even more extensive alternative is to calculate an overall matrix which, on the one hand, carries out the operations which are the same for all pixels or, on the other hand, the pixel-specific corrections as to distortion, tilting, etc. This relieves the FPGA but, because of the necessary determination of the overall coefficients for which of course more coefficients have to be calculated, there is a higher load on the units used for calculating the coefficients, which can often be a sequential CPU.

It is pointed out that such linking of different corrections which represent respective linear operations can be caused by matrix multiplications, i.e., for calculating the coefficients for the corrections, typically both additions and multiplications are necessary. It is mentioned that, if applicable, such a matrix multiplication can also be carried out within an FPGA or other reconfigurable arrays.

Moreover, there might be the case that details in images are recorded in a distorted manner because of the viewing direction of the camera, e.g., because vertical lines of doors, windows and the like have to be recorded from far at the top or bottom. This can give the viewer the impression that respective structures "tilt". Also this can be corrected in a manner known per se and the corresponding corrections are in turn linear. It is obvious that these corrections of tilting depend on the respective viewing direction and depend on the zoom setting. Thus, they change in particular as the pan-tilt-zoom parameters change.

Moreover, often further corrections are necessary in the image. For example, an image that was recorded with bad lighting can possibly be noisy. The noise will typically depend, e.g., on the light incidence and on the gain (ISO value) set on the sensor. For reducing the effects of optical sensor noise in the image, algorithms which improve the optical impression of noisy images are known. In this regard, linear correction can in turn be made. It is pointed out that there are also non-linear denoising methods. Execution thereof on the reconfigurable array is disclosed as a possibility.

It is pointed out that, if applicable, further image operations are possible for the preparation.

It is obvious that respective operations are necessary if it is intended to process video images, i.e., video data streams. For example, in connection with video data preparation, it is often necessary to subject the image raw data for each individual frame to a debayering (demosaicing) operation, to carry out geometrical rectifications for each individual image, to carry out a white balance for each individual image, wherein preferably the white balance remains unchanged or almost unchanged from image to image in a relatively long sequence if the light conditions do not change considerably, etc. Moreover, in case of chromatic lens errors it might be advantageous to carry out linear corrections in this regard.

It is assumed that the computing power of the FPGA is sufficient for preparing the raw data of the individual images from the sensor for a given set of parameters, e.g., a given set of PTZ parameters, ISO values and a given color temperature, i.e., carry out the color corrections, geometrical rectification, denoising, etc.

The FPGA can calculate an output image per se in that all pixels of a raw image are loaded simultaneously in the FPGA and then, by suitable links, all pixels of the output image are calculated. However, it will be appreciated that this procedure is disadvantageous. As the resolution of the sensor increases, the FPGAs must be larger and larger. This causes considerable costs. Therefore, it makes more sense to load only parts of a raw image into the FPGA and then determine the respective associated image areas in the output image. In this regard it is advantageous that as a rule only comparatively slight geometric distortions and the like occur. This in turn entails that a pixel in the raw data input image will only make a contribution to pixels which are comparatively close to the respective pixel in the output image. For example, at the edge of a fish eye lens quite considerable distortions can be monitored, but also there a pixel will not make a relevant contribution to a diagonally opposite output image pixel. Hence, the FPGA can at first be selected to be comparatively small, even if very high-resolution sensors are used. In this case it must then only be guaranteed that data processing per se is sufficiently fast.

As mentioned above, a plurality of the required mathematical operations for the preparation of a raw data image can be carried out by matrix operations. These operations can be carried out very efficiently by an FPGA. For a matrix multiplication, substantially any pixel in the input raw data image must be multiplied by a specific coefficient and then the raw data image pixels multiplied by their corresponding coefficients must be added for determining a respective output image pixel.

On the basis of the above it will be appreciated that when determining an image the coefficients by which the raw image input pixels must be multiplied are dependent on their pixel positions in the input image and dependent on the respective output image pixel to be determined. Moreover, it is obvious that they depend, e.g., on the above-mentioned parameters such as PTZ parameters, IOS values, color temperature, desired geometrical distortion, denoising.

This means that, e.g., for calculating output image pixels at the upper edge of the output image, other correction parameters are necessary for the geometrical rectification and thus a different combination of the input raw image pixels than for determining the output pixels in the middle image area. When looking at the overall linking matrix, which indicates which input pixels have to be multiplied by which coefficients in order to make a respective contribution to a specific output pixel, it will be obvious from the above that, in view of the fact that many input pixels will not make any contribution to a given output pixel, this linking matrix comprises a plurality of matrix coefficients which identically equal zero. The output coefficients being different from zero, however, are only a small part of the matrix and, moreover, are close together. Hence, it is not necessary to calculate the matrix completely but it is sufficient to calculate a small part of the matrix multiplication.

Moreover, it is obvious that the input pixels of the raw data image per se are always linked in the same manner for a given parameter set for determining a respective output pixel. It is only necessary to use different parameters, namely, on the one hand, e.g., depending on the PTZ parameters and, on the other hand, depending on the output image pixel which should currently be determined.

The invention makes use thereof.

It is evident from the above description of the structure of the video camera arrangement of the invention that the CPU knows parameters such as the PTZ parameters and, if applicable, the color temperature (which can be determined automatically by the FPGA or the CPU by image analysis or, e.g., can also be set manually). Moreover, if desired, tilting corrections for specific positions are known, so that at least by interpolation a tilting correction can be carried out for each position. It is pointed out that, if applicable, tilting corrections can depend on the concrete camera mounting, whereas, e.g., the geometrical rectification depends on the configuration of the camera lens and, in this regard, is already known independent of the mounting of the camera.

In the present case, the CPU is so powerful that all coefficients of a correction matrix, by means of which the contributions of any raw data input image pixel to a specific output image pixel are determined, can be calculated within one frame and stored in the memory 11, i.e., in the form of reconfiguration data for the partial, dynamical reconfiguration of the FPGA 4, which are determined by the CPU from the coefficients. It is assumed that an overall correction matrix is calculated which determines all desired corrections simultaneously. It is pointed out that, as already mentioned, specific ones of the required corrections such as debayering, denoising, adapting a color temperature that is isotropic throughout the image, will be independent of a current image detail and, therefore, it might be advantageous that for calculating an overall correction matrix at first a first matrix is calculated by means of which the corrections which are the same for all image points can be carried out. Then, the corrections which vary from image area to image area or a respective correction matrix must be calculated. Then, there are two matrices, namely on the one hand a matrix which describes the corrections which are independent of the respective position in the image, and a matrix which relates to the corrections which depend on the respective positions. An overall correction matrix can be determined by matrix multiplication of both matrices by each other, wherein typically matrices are used in which the number of columns equals the number of rows. It is pointed out that, if applicable, where, e.g., noise is determined only in small areas, the matrix can be supplemented in order to obtain a square matrix. It is obvious that, if applicable, the square partial correction matrix which remains constant for all image areas can easily be stored, if applicable, after it has been calculated once for the image, namely for the current color temperature, the denoising of the image required in case of a specific ISO value, etc. This leads to a relatively simple matrix calculation which is not intricate. It is moreover stressed that it is easily possible to process an input image for generating an output image in such a manner that the input image runs several times through the reconfigurable array thereby generating one or more intermediary image(s). In each run a different processing can take place and accordingly a different configuration can be present in the array. In such a case it is only necessary to change one of the multiple configurations that are processed as a whole. For this purpose, new configuration data can be determined in (quasi) real time for this configuration to be changed and then configured into the array if required, i.e., if the respective configuration is processed. For example, first a debayering configuration can be carried out, then a white balance configuration and then a fish eye rectification configuration. A change of the PTZ parameters can require, on the one hand, if areas with other color temperatures of the illumination are detected, a change of the white balance configuration and, on the other hand, a change of the configuration for rectifying a fish eye lens. For both configurations coefficients can be determined separately of one another. The changed white balance configuration will then have the same path balancing as the previous white balance configuration and the changed configuration for rectifying a fish eye lens will have the same path balancing as the previous configuration for rectifying a fish eye lens. However, it is clear that the white balance configuration does not have to have the same path balancing as a configuration for rectifying a fish eye lens. It is further pointed out that it is easy to change a configuration which has already been predetermined in view of the function determination and the linking of coarse granular cells in such a manner that only other coefficients are adapted. This can be done quickly and at runtime without interruption of a video data stream.

Hence it is possible to determine, based on the calculated matrix coefficients, configurations of the FPGA or partial reconfigurations by means of which in the present case the contributions to a specific output image pixel are calculated for one respective raw image line or one respective raw image block of a raw image line or a raw image block obtained via line 5 from the image sensor 2.

As a rule, a pixel in the output image will of course comprise contributions from pixels of different lines in a raw data input image. For example, in a typical case, in an image with, e.g., 1024×1024 pixels, a pixel of the output image in a line can be influenced by pixels of other lines. If applicable, a 16 lines wide input image area must thus be taken into consideration, and it will be appreciated that typically also for other corrections only about 16 pixels wide blocks have to be taken into consideration. Moreover, typically, e.g., only a 16 columns wide image area must be taken into consideration for determining an output pixel. However, it is pointed out that the statement that squares having a size of 16_times_16 pixels are taken into consideration for determining an output pixel is by no means meant to be restrictive but only serves as an explanation. In case of very slight distortions, also a smaller pixel area might be sufficient. In case of severe distortions, larger corrections might be desirable. Hence, in particular for edge areas a correction value that is different from the above one might make sense. Moreover, the question as to how many pixels have to be taken into consideration for carrying out specific geometric corrections of a distorting lens also depends on the sensor resolution, i.e., the overall number of pixels in the image sensor, as well as on the lens opening angle and on the acceptable amount of remaining distortions. It has already been discussed above that the determination of the corrections by matrix multiplications in accordance with geometrical corrections planned once is comparatively little intricate. If applicable, it is therefore possible to make line-wise reconfigurations or also provide a coefficient data stream from the matrices which is fed into the array simultaneously with the video data in a synchronized manner. It is pointed out that it has been mentioned only exemplarily that the sensor is a CCD sensor and that other types of sensors can of course be used readily for the purposes of the invention.

It is not disturbing that multiple lines of the input raw image are necessary for determining a line of the prepared output image. The data flow-like processing in the logic cell field allows an accumulation of the contributions made by the raw data input image pixels which are multiplied by the required coefficients to a given output pixel. Hence, if applicable, it is possible that, e.g., image data which are loaded in a line-wise manner from the image sensor into the FPGA are recalculated to output image lines which are then stored in the buffer 12 and, as soon as a complete image or a row of complete images is present in the buffer 12, read out via the CPU and transmitted via the interface. It is pointed out that also a data compression can be made, such as a video coding that is known per se.

It can be understood from the above that the clock from the clock source 7, which is delivered via the lines 6 to the image sensor, the FPGA 4 and the CPU 9 and, if necessary, also to other components of the video camera arrangement, determines the frequency at which the lines and frames are generated by the image sensor, at which the FPGA prepares the raw image data, and at which the CPU performs the operation assigned to it. It should be noted that the CPU must, as a rule, perform a plurality of different operations which partly cannot be predicted when programming the control and preparation or evaluation programs running in the video camera arrangement.

For example, during programming it cannot be predicted when signals are received via the input/output interface 13, with which video image data having a specific resolution and specific PTZ parameters are requested. Therefore, the CPU of the present video camera arrangement will, in the manner known per se, typically and preferably be notified by so-called interrupts that, e.g., the lens must be tilted differently and, if applicable, new FPGA configuration data must be determined for this purpose. The CPU and/or the operating system running thereon will comprise a task manager or scheduler which prioritizes the tasks and takes care that the CPU processes the required tasks in such a manner that specific processes are not impaired too much by the delays caused by the other tasks.

The CPU will typically be operated at a clock rate which is much higher than the clock rate at which the image sensor outputs lines and which will also be higher than the clock frequency of the FPGA.

For making sure that the CPU can guarantee a proper operation of the video camera arrangement irrespective of the unpredictable behavior and the different clock rates or data rates of image sensor and FPGA, the image sensor outputs synchronization signals to the FPGA 4 and the CPU 9. In the presently described embodiment, these synchronization signals will comprise line synchronization signals and image (i.e., frame) synchronization signals so that both the FPGA and the CPU are informed when a new line starts or the pervious line is completed and when a new frame starts or a previous frame is fully completed. The CPU will further know how many clock cycles the FPGA needs for completely preparing the data of a frame or a line. In other words, the CPU knows how many clock cycles of the clock from the clock source 7 after an image synchronization signal a complete frame can be expected in the buffer 12. The knowledge of this delay is also due to the fact that it can be determined easily in known configurations of the FPGA. The presently described embodiment is advantageous because the image sensor provides image data at a virtually constant rate and the FPGA does not perform any other tasks.

The CPU 9 can configure the FPGA 4, i.e., load an initially complete configuration into the FPGA 4 when operation starts, i.e., when the camera is switched on. The CPU 9 can further configure the FPGA completely newly during operation, i.e., change the function of the FPGA completely. Depending on the configuration of the FPGA, this can also be done at its runtime, i.e., without the FPGA having to be out of operation for a relatively long time, for example, by storing in advance so-called "shadow configurations" and then changing the mode of operation.

An FPGA can typically be adjusted in view of the function of the individual, if applicable coarse granular logic cells and their interconnections. This means that it must be indicated from which cells in the logic cell field a specific cell receives operands and to which cells it outputs the results calculated by it. It is pointed out that when configuring an FPGA, care should be taken that time delays within an FPGA can indeed be significant. Thus, this can lead to the fact that, for example, a cell which receives a result from a neighboring cell and should combine it with a simultaneously generated result from a very remote cell of the FPGA must wait until the results from the remote cell are received, or that the pathways in the FPGA must be taken into considerations. This is called path balancing.

The CPU can further reconfigure the FPGA partially at runtime. During a partial configuration of the FPGA, not all functions, constants and links stored in the FPGA as well as registers optionally introduced into the data paths for the purpose of path balancing are newly configured but either only specific partial areas of the FPGA are newly configured and/or only specific values such as coefficients are changed, preferably without interrupting the FPGA's operation as such.

It will be understood from the above that if correction parameters change, e.g., because of changes of the PTZ parameters, typically only coefficients in the FPGA have to be changed for adaptation to a changed correction matrix. This partial reconfiguration, however, can be carried out particularly easily, e.g., in that only specific constants stored in advance in the FPGA are changed. This is preferred. It is also preferred to change only coefficients without influencing the path balancing. It is pointed out that when the runtime within the array might be influenced by coefficient changes, in an initial determination of the configuration (which optionally takes place before permanent camera operation) using known place and route mechanisms, etc. it might advantageously be possible to introduce (possibly additional) registers where later otherwise critical runtime changes might occur because of the coefficient change.

In principle it is possible to store matrix coefficients or configurations or configuration data for the partial reconfiguration of the FPGA in a table so as to take into account changes of pan, tilt and zoom parameters, the color temperature, noise corrections with different amplifications in the image sensor, etc. However, it will be appreciated that this would lead to an exorbitantly large lookup table in view of the large number of possible combinations and the wish for a correction that is as exact as possible. It is not possible to store such a lookup table in a reasonable manner in advance in the FPGA in memories possibly present therein, for example, a plurality of configuration memories, and it would not make sense to provide the camera with a sufficiently large memory with correction values because such a memory as a rule is clearly too expensive and the technical developments do not show that such memories might be efficient in the foreseeable future.

Therefore, the present invention suggests in this embodiment to generate configuration data for the preparation configurations used for recalculating video input data to prepared video output data, for example, input raw image data or prepared input data to output image data, in the CPU 9. (Where an FPGA is used which has such a high power that another configuration for calculating the coefficients can be carried out "alongside" during the image preparation in an interconnected manner, this CPU task can of course be performed by the FPGA itself.)

The configuration data are generated by means of the CPU as follows, as is exemplarily described on the basis of the adaptation of the FPGA to changed PTZ values:

After the CPU 9 has initialized the FPGA 4 for the operation of the camera 1 in a starting position with starting PTZ values and has output the frames generated by the FPGA from the buffer 12 to the I/O interface 13 for a specific time period, the command to change the PTZ values is received at a specific time point via the input/output interface 13. This generates an interrupt in the CPU 9, and for the processing thereof a sub-program is called, under the control of which the lens pans, tilts and zooms in accordance with the changed demand.

First, it is assumed that the changes are only slight so that in case the FPGA 4 is further used with the configuration being unchanged, a distorted but only slightly distorted image is output. After the pan-tilt-zoom process has finished, the CPU 9 will store partial reconfiguration data for the changed PTZ values in the RAM 11 and will indicate to the FPGA 4 via the control line 14 that a new configuration for the FPGA 4 was loaded in the memory. In this context the FPGA 4 can be informed at which location in the RAM 11 the changed configuration is stored.

It will be appreciated that where the FPGA 4 processes simultaneously only small areas of the raw data image received by the FPGA 4 from the image sensor 2 via the line 5, partial reconfiguration data are loaded from the RAM 11 cyclically in response to received line synchronization signals fed via line 8 from the image sensor 2 also to the FPGA 4, namely by cyclically passing through a given address space. When changing the rectification, thus a different address space must be cyclically passed through. In the present embodiment, the FPGA will cause the change of the passed through address space when, on the one hand, it has been signaled by the CPU 9 via the line 14 leading to the FPGA that the calculation of the new correction parameters has been finished in that all partial reconfiguration data for the new preparation matrix or the new preparation operations are stored in the RAM 11 at a specific address and, on the other hand, the image sensor 2 indicates that a new frame is started, namely by means of synchronization signals on line 8. It is pointed out that in the present application it is also referred to an overall correction matrix, preparation matrix, etc. if reference is made to the overall corrections of an image or to those corrections to which reference is made for an overall image being composed of a plurality of partial images or disjunctive areas, but for the calculation of each pixel or each small group of pixels a surface-dependent small matrix having the size of, e.g., 8×8 is present. Where configuration data once calculated are stored in the RAM, this storage can be performed such that, e.g., the required configurations are red in image line by image line. Moreover, it is pointed out that where an output image comprises multiple partial images, for example, because multiple entrance and exit doors must be monitored in a room and an overall image should be generated which shows these doors next to one another in a large view, in addition to a matrix multiplication also the addition of an offset can be provided so that the respective doors or other image details appear at the correct position in the output image.

The change of the configuration data then leads to the fact that the rectification in the new frame is improved and the view thus becomes clearer and more accurate to the viewer. This is particularly advantageous in connection with safety monitoring because errors and a bad image quality particularly easily make the observer tired, which reduces safety. With the changed reconfiguration data from the cyclically passed through address space output image, the FPGA 4 will then provide data in the buffer 12 which are read out by the CPU 9 in response to the receipt of frame synchronization signals and the thus generated interrupts (IRQ) and fed to the input/output interface as required.

It has been stated above that first a PTZ change that is only slight should be discussed. Typically, in particular a mechanical displacement will only be performed so slowly that there are multiple frames between substantial changes. Thus, it is advantageous to pass slowly and gradually, i.e., in an almost stepwise manner, through the change of the PTZ values and to adapt the corrections to be performed by the FPGA in each step to a current, if applicable current average, PTZ parameter set. Thus, an optimum rectification is achieved during panning and tilting along a pan/tilt trajectory. In this connection it is pointed out that if a specific panning movement is carried out repeatedly and the corresponding data have a size that can still be handled, the CPU 9 does not have to newly calculate the reconfiguration data each time, but the configuration for a given trajectory can be stored in the RAM and then different address spaces, which are passed through cyclically, are successively addressed again and again. The respective memory requirements are lower than would be in case own configuration data sets or partial reconfiguration data sets had to be stored for each potential available pan, tilt and zoom value because instead of a three-dimensional parameter field only a one-dimensional field is necessary. Therefore, storage can be advantageous because energy required for the calculation can be saved. It is pointed out that moreover a cache-like or other storage of reconfiguration data is possible. For points that are often accessed in connection with specific PTZ values and/or for points most recently accessed, correction configurations can thus be stored, which makes sense because it is often panned back in images during searches.

It has been mentioned above that a change from one address space in which a first partial reconfiguration is stored for the FPGA to a second address space preferably takes place when the frame changes. However, this is not compulsory and, if applicable, a change can be line by line. However, it is pointed out that then, if applicable, an image disturbance which passes through in a line-like manner is observed especially in case of a step-wise major correction.

Moreover, it is pointed out that it is not compulsory to store correction data for an entire frame in advance in a memory 11, in particular if the costs for this should be avoided and possibly only few correction data have to be calculated and/or the CPU has sufficient power. In such a case, the data can be calculated line by line and stored in an only small FIFO or buffer memory for the respectively required partial reconfiguration of the FPGA in accordance with a current PTZ parameter set and the like. It is also pointed out that, if applicable, it is only necessary to provide suitable coefficients, which can be loaded like operands into the FPGA. In the present case also this should be understood as configuration.

It will be appreciated that variations of this system are easily possible. For example, this will be described with reference to the following figures, wherein it is pointed out that different variations can be combined with each other and the embodiments described here should not restrict the possibilities in this regard.

Figure 2:
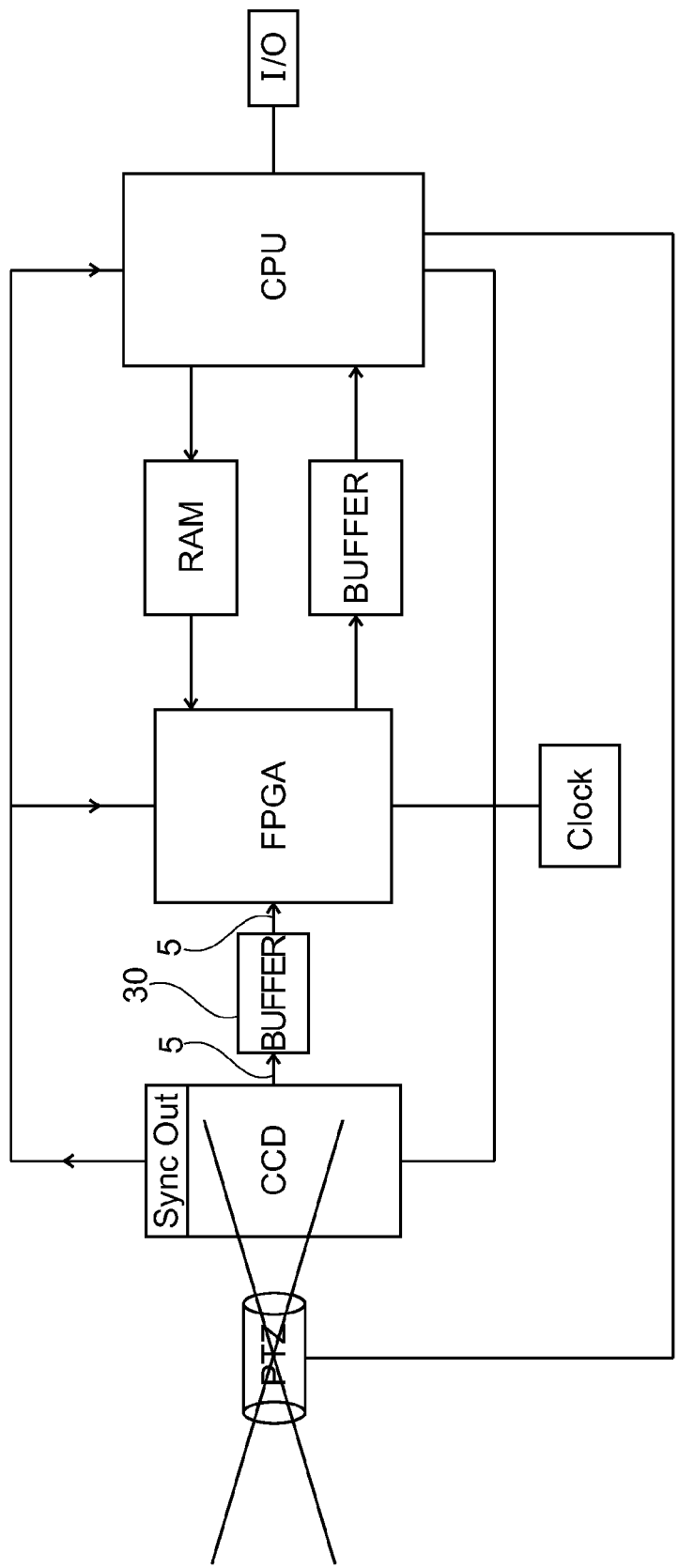
FIG. 2 shows a changed embodiment.

According to FIG. 2, an additional buffer memory 30 is provided between the reconfigurable logic cell arrangement and the image sensor. The remaining elements correspond to those of FIG. 1 and, therefore, are not additionally marked with reference numbers. Such an arrangement is advantageous in particular if the FPGA has also further data processing tasks or delays must be expected at the beginning of data processing, e.g., because the CPU can provide reconfiguration data only in a delayed manner because of other tasks, because presently nothing can be stored in an FPGA output buffer such as buffer 12 because data present therein have not yet been called by the CPU, etc.

Figure 3:
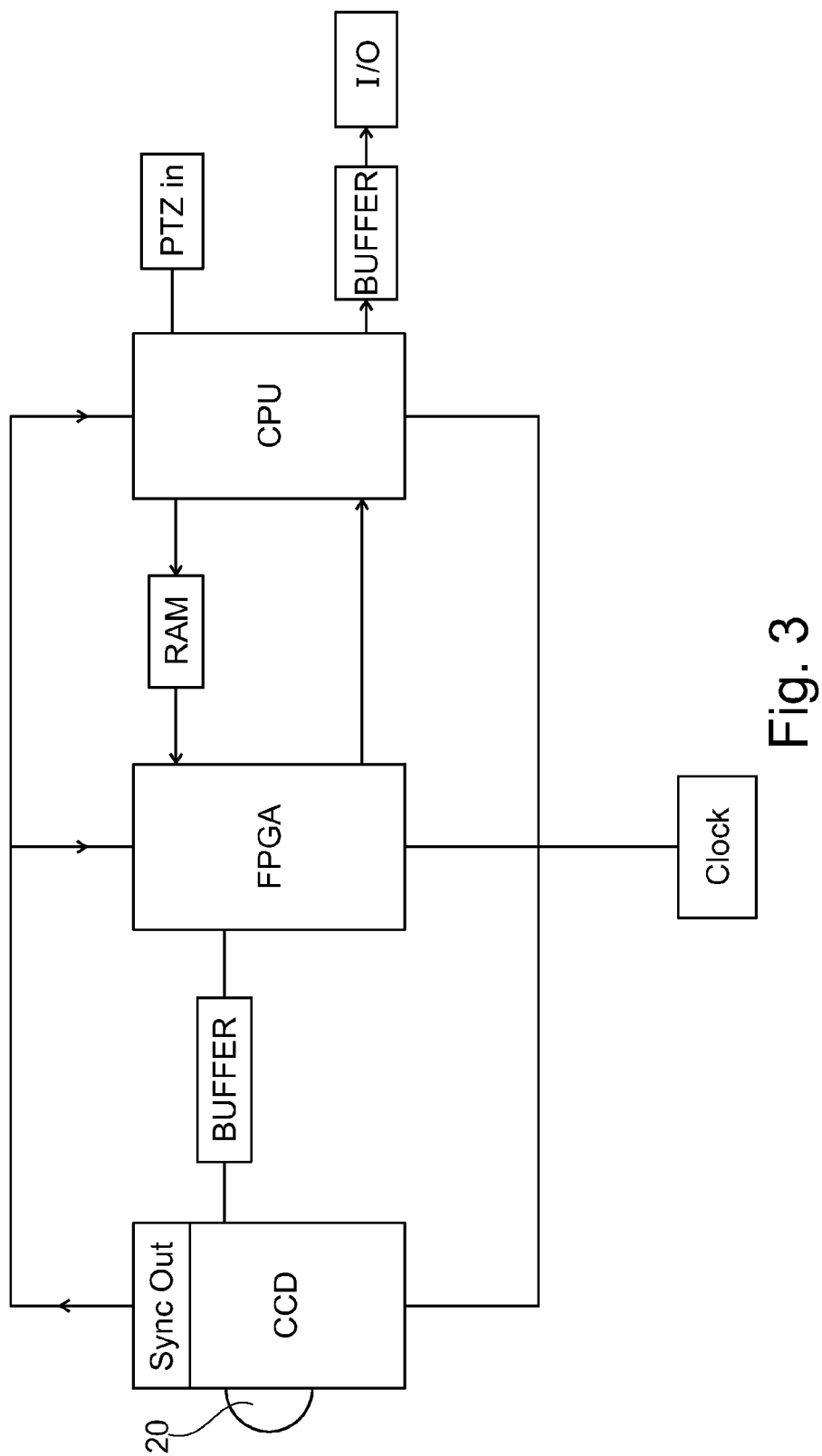
FIG. 3 shows a further embodiment.

According to FIG. 3, the buffer memory between FPGA and CPU can be omitted and the CPU can store itself the images which are now obtained line by line from the FPGA. This can be advantageous in particular if a further image processing is anyway desired, which can only hardly be processed in data streams, which requires often changing tasks, etc. It is pointed out that, e.g., an object recognition can be performed in the images, that compression can be performed, that sharpening can be performed, and so on. The division of these tasks and the further preparation between FPGA and CPU will depend on the computing power of both elements and the possibility to carry out the required computing operations in the data stream. Nevertheless, the presence of a—if only little—memory for the data exchange between CPU and FPGA is highly preferred because it substantially contributes to a decoupling thereof with only little effort being required.

In FIG. 3, only one wide angle lens, marked by reference number 20, is further provided instead of the PTZ lens. Such a lens with fixed focal length, which is moreover mechanically fixed during monitoring, makes sense if the image sensor has an accordingly high resolution for the required monitoring. Then, the PTZ adjustment can be performed electronically. It is pointed out that especially this leads to a very quick adjustment. In such a case the PTZ values can, if applicable, also be changed in a step-wise manner. In this case it might be advantageous to first calculate and provide, by means of the CPU, partial reconfiguration data for the newly requested PTZ values changed in a step-wise manner and only then configure the PTZ value change. It might also be possible that no complete raw data image is output to the FPGA at all.

It is also pointed out that in this arrangement, in which a high-resolution sensor is used together with a very wide-angle lens, image data can be requested simultaneously from many points, e.g., for monitoring different, disjunctive, far apart room areas of particular interest. In such a case it is not necessary to evaluate and prepare the complete raw image set of a frame, and the FPGA is possibly again partially reconfigured accordingly. It is pointed out that different room areas can nevertheless be corrected with a per se equal configuration, i.e., equal interconnections and/or functionality of the individual local cells in the logic cell field of the FPGA, and only for different areas different coefficients have to be configured partially. Since only small image areas such as, e.g., 16×16 or 256×256 pixels have to be linked with each other and considered for determining an output pixel, it is also possible, by tiling many small areas, to determine also details having different sizes and formats or a different aspect ratio without a complete new configuration being required. If applicable, this allows a quick change of details, detail size in the final image, number of details, etc., because just no dedicated configurations must be determined but it is only of interest which 16×16 pixel block in the input raw image makes a contribution to a specific output image pixel.

It is pointed out that especially in very wide-angle images either a common configuration can be carried out together for all partial images, which is then newly determined for each change of the PTZ and other values in a partial image, or that a specific configuration is used for each partial image, which is then changed alone. Thus, either specific FPGA areas can be reserved for the preparation of specific image areas, which leads to an only small-space reconfiguration in the FPGA, or the entire FPGA is used alternatingly for respective different image areas.

Figure 4:
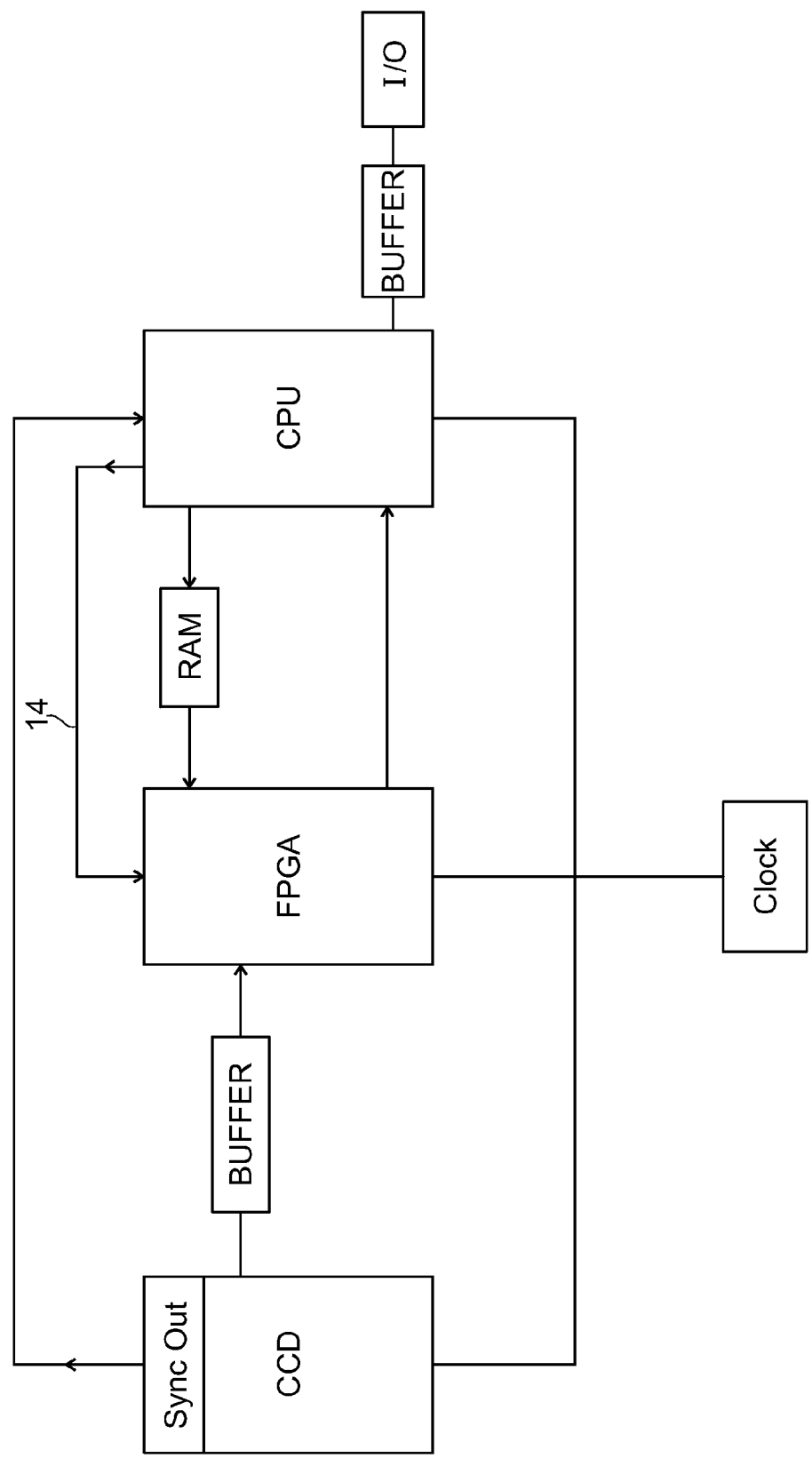
FIG. 4 shows a fourth embodiment.

According to FIG. 4 it is not urgently necessary that synchronization signals are fed from the image sensor directly to the FPGA. Rather, it is also possible to first send the synchronization signals to the CPU and there generate a respective signal by means of which the presence of new data from the image sensor is indicated to the FPGA. This can be done simultaneously with the signal indicating to the FPGA that more recent configuration data or partial reconfiguration data are stored in the RAM, i.e., for example, via a line 14. However, because of the above-mentioned, non-predictable processes running in the CPU, it can be advantageous to provide in this case at least a small buffer between image sensor and FPGA so that slight delays can be compensated without having a negative effect.

FIGS. 5A and 5B clarify that it is not urgently necessary to use an external RAM between FPGA and CPU. Rather, it is also possible to use an FPGA in which a plurality of shadow registers or RAMs are present for the reconfiguration or partial reconfiguration.

Moreover, it is pointed out that a RAM for the communication between FPGA and CPU can be a dual-ported RAM that will be preferred and that the separation between the memory for configuration data values and the image data buffer as shown in FIGS. 1 and 2 is not urgently necessary. Rather, this separation has only been provided and described for the purpose of clarification. However, from a technical point of view it is clearly possible to provide common memories as long as it has been clearly determined when respective data and configurations can be found in which storage area.

Furthermore, it is pointed out that data can also be exchanged via the cache. Respective mechanisms from the FPGA technology or the technology of reconfigurable logic cell arrangements can readily be used. It is further pointed out that a data exchange or a data transmission, using the CPU cache, can also be performed for configuration data between FPGA and CPU.

It is evident from the above that a partial reconfiguration is particularly non-problematic if per se always a matrix multiplication with a correction in matrix-determined size is carried out for all image points and for the adaptation of the reconfiguration data at runtime to changed settings of the video camera arrangement only the matrix coefficients must be changed, wherein at the same time it is also guaranteed that the FPGA area intended for the matrix multiplication is passed through by each operand or linked partial result in coefficient-independent time, i.e., a path balancing is not changed.

The invention claimed is:

1. A method for operating a video camera arrangement, the method comprising:
   generating, by an image sensor, image data;
   processing, by a logic cell arrangement, the image data;
   changing a setting of the video camera arrangement during runtime;
   calculating, by a processing unit, reconfiguration data for the logic cell arrangement based on the changed setting during the runtime;
   providing the calculated reconfiguration data to the logic cell arrangement; and
   reconfiguring the logic cell arrangement with the reconfiguration data.

2. The method according to claim 1, wherein the video camera arrangement is a PTZ-capable video camera, wherein PTZ parameters are changed during the operation, and wherein configuration data are changed to allow a changed image rectification according to the changed PTZ parameters during preparation of the image data.

3. The method according to claim 1, wherein the reconfiguration data are buffered in a memory, after the reconfiguration data have been calculated.

4. The method according to claim 3, wherein the video camera arrangement generates frames in a first clocked manner, wherein the logic cell arrangement operates in a second clocked manner, and wherein the reconfiguration data are loaded from the memory into the logic cell arrangement in accordance with a clock.

5. The method according to claim 4, wherein the video camera arrangement generates video image sync data as line-related and/or frame-related sync signals, and wherein the logic cell arrangement is synchronized to the video image sync data.

6. The method according to claim 5, wherein the logic cell arrangement is reconfigured at least partially several times per frame.

7. The method according to claim 1, wherein the logic cell arrangement calculates output video image data from the image data having pixels by calculating a linear combination of input pixels using coefficients for generating the output video image data.

8. The method according to claim 7, wherein the coefficients are changed during reconfiguration such that path balancing within the logic cell arrangement is not changed.

9. The method according to claim 8, wherein only the coefficients are changed during the reconfiguration.

10. The method according to claim 9, wherein calculating the reconfiguration data comprises determining the coefficients of a rectification matrix by multiple additions and/or multiplications.

11. The method according to claim 10, wherein preparing output video image data comprises a plurality of operations from the group consisting of debayering, color temperature adaptation, brightness adaptation and geometrical image rectification, and wherein the plurality of operations are performed as one single matrix multiplication.

12. The method according to claim 1, wherein processing of the image data comprises combining pixels in an image in a pixel- or block-wise manner using coefficients, wherein calculating the reconfiguration data at the runtime comprises recalculating the coefficients, and wherein reconfiguring the logic cell arrangement comprises maintaining path balancing by applying the changed coefficients.

13. A method for providing video data streams with a digital video camera arrangement, the digital video camera arrangement being digitally adjustable and having an image sensor and a reconfigurable logic cell arrangement configured to calculate output image data from input image data provided by the image sensor, the method comprising:
  changing settings of the video camera arrangement by digitally adjusting the video camera arrangement during operation of the digital video camera arrangement;
  calculating reconfiguration data for the reconfigurable logic cell arrangement in view of the changed settings;
  providing the reconfiguration data to the reconfigurable logic cell arrangement;
  reconfiguring the reconfigurable logic cell arrangement according to the reconfiguration data at runtime; and
  preparing the output image data from the input image data in accordance with the reconfiguration of the reconfigurable logic cell arrangement.

14. The method according to claim 13, wherein the video camera arrangement generates frames in a first clocked manner, wherein the reconfigurable logic cell arrangement operates in a second clocked manner, and wherein the reconfiguration data are loaded from a memory into the logic cell arrangement in accordance with a clock.

15. The method according to claim 14, wherein the video camera arrangement generates video image sync data as line-related and/or frame-related sync signals, and wherein the reconfigurable logic cell arrangement is synchronized to the video image sync data.

16. The method according to claim 15, wherein the reconfigurable logic cell arrangement is reconfigured at least partially several times per frame.

17. The method according to claim 13, wherein the reconfigurable logic cell arrangement calculates the output image data from the input image data having pixels by calculating a linear combination of input pixels using coefficients for generating the output image data.

18. The method according to claim 17, wherein the coefficients are changed during reconfiguration such that path balancing within the reconfigurable logic cell arrangement is not changed.

19. The method according to claim 18, wherein only the coefficients are changed during the reconfiguration.

20. The method according to claim 19, wherein calculating the reconfiguration data comprises determining the coefficients of a rectification matrix by multiple additions and/or multiplications.

21. The method according to claim 20, wherein the output image data are prepared based on a plurality of operations from the group consisting of debayering, color temperature adaptation, brightness adaptation and geometrical image rectification, and wherein the plurality of operations are performed as one single matrix multiplication.

* * * * *